J. J. CONDRAN.
BUMPER.
APPLICATION FILED JAN. 6, 1920.
1,339,167. Patented May 4, 1920.
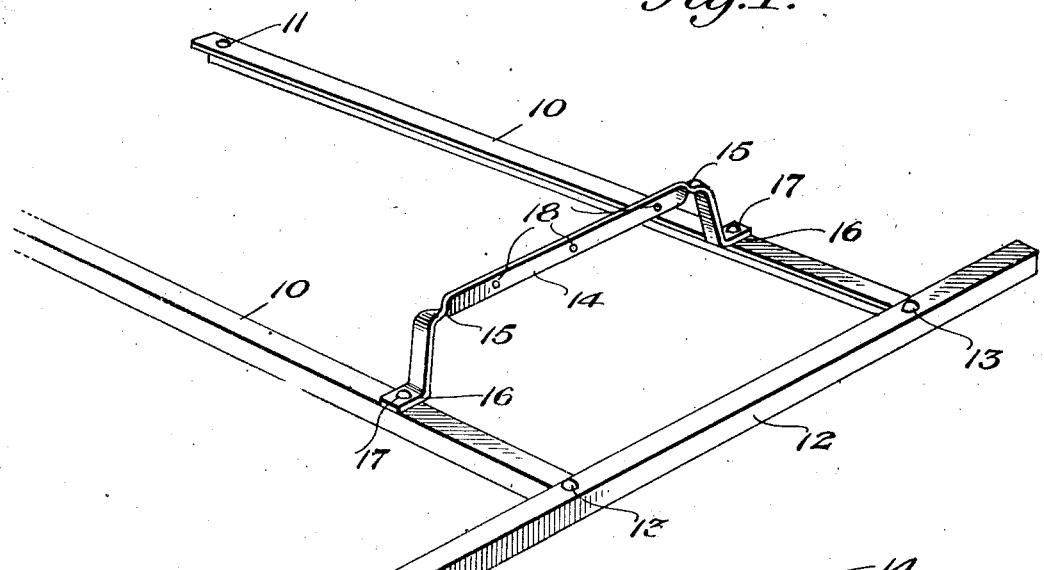
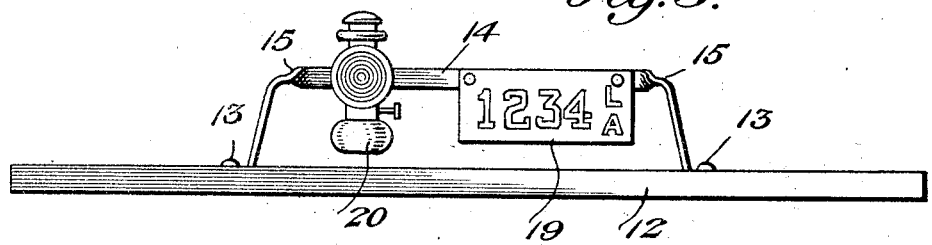
WITNESS:
INVENTOR.
J. J. Condran
BY
Victor J. Evans
ATTORNEY

UNITED STATES PATENT OFFICE.

JOSEPH J. CONDRAN, OF NEW ORLEANS, LOUISIANA.

BUMPER.

1,339,167.  Specification of Letters Patent.  Patented May 4, 1920.

Application filed January 6, 1920. Serial No. 349,670.

*To all whom it may concern:*

Be it known that I, JOSEPH J. CONDRAN, a citizen of the United States, residing at New Orleans, in the county of Orleans and State of Louisiana, have invented new and useful Improvements in Bumpers, of which the following is a specification.

This invention relates to bumpers for vehicles and is especially designed for use upon the rear end of an automobile.

The object of the invention is the provision of a bumper which may be easily and quickly attached to the vehicle and which includes a novel form of brace arranged so as to support the license tag and tail lamp in a position to prevent their being obscured by the cross bar of the bumper.

Other novel features and details of construction will appear as the following description is read in connection with the accompanying drawings:

In the drawings:

Figure 1 is a perspective view of the bumper.

Fig. 2 is a side elevation of the same.

Fig. 3 is a rear elevation with the license tag and tail lamp in place.

Referring to the drawings in detail, like characters of reference denote the corresponding parts throughout the several views.

In carrying out the invention, there is provided a pair of substantially parallel side bars 10, which are preferably formed of angle iron and which have their inner ends provided with openings 11 for the passage of bolts or other fastening devices, by means of which the bumper may be secured in position. The outer ends of the side bars 10 have secured thereto a cross bar 12, the said bar being also formed of angle iron and being secured to the side bars as indicated at 13.

Extending transversely across the bumper and secured to the side bars 10 is a combined brace and support 14. This combined brace and support is formed of a substantially flat bar which is provided at a point adjacent each end with a twist or quarter turn as shown at 15 and has its extremities bent to provide feet 16 which are adapted to rest upon the upper edges of the side bars 10 and to be bolted or otherwise secured thereto as indicated at 17. This provides a combined brace and bar which has an intermediate portion offset or raised above the upper surface of the bumper with its width vertically disposed so as to prevent a flat face toward the bumper end. This combined brace and support 14 is provided with openings 18, by means of which a license tag 19 and a tail lamp 20 may be secured in a position to dispose them both above the upper edge of the bar 12, where they will be in plain view from the rear of the vehicle.

The invention is susceptible of various changes in its form, proportions and minor details of construction, and the right is herein reserved to make such changes as properly fall within the scope of the appended claim.

Having described the invention what is claimed is:—

A bumper for vehicles comprising side bars adapted to have their inner ends secured to the vehicle, a cross bar secured to the outer ends of the side bars and a combined brace bar and bracket connecting the side bars and arranged parallel to the cross bar, said brace bar and bracket comprising a strip of metal bent at each end to provide an intermediate offset portion having its width vertically arranged and provided with openings for the attachment of a license tag and tail light and its extremities secured to the side bars.

In testimony whereof I affix my signature.

JOSEPH J. CONDRAN.